United States Patent [19]

Tanaka et al.

[11] Patent Number: 5,008,873
[45] Date of Patent: Apr. 16, 1991

[54] TILT ADJUSTMENT MECHANISM FOR OBJECT LENS DRIVING DEVICE

[75] Inventors: Toshiyuki Tanaka, Osaka; Etsuji Minami, Nara, both of Japan

[73] Assignee: Sharp Kabushiki Kaisha, Osaka, Japan

[21] Appl. No.: 347,210

[22] Filed: May 4, 1989

[30] Foreign Application Priority Data

May 7, 1988 [JP] Japan ................. 63-111286

[51] Int. Cl.⁵ .............................................. G11B 7/08
[52] U.S. Cl. ............................ 369/44.14; 369/44.15; 369/244; 350/255
[58] Field of Search ............... 350/245, 247, 251, 252, 350/254–255; 369/244–245, 255–257, 43, 44.11, 44.15, 44.14, 44.17–44.21

[56] References Cited

U.S. PATENT DOCUMENTS

| 4,679,903 | 7/1987 | Kasahara et al. | 369/44.19 X |
| 4,745,589 | 5/1988 | Nomura | 350/255 X |
| 4,818,066 | 4/1989 | Nose | 369/44.16 X |
| 4,863,240 | 9/1989 | Nalcajima et al. | 350/255 X |
| 4,882,723 | 11/1989 | Van Rosmalen | 369/44.16 |
| 4,887,888 | 12/1989 | Nose | 369/44.17 |
| 4,913,527 | 4/1990 | Jessop | 350/255 |

FOREIGN PATENT DOCUMENTS 2508752 12/1982 France .
58-179946 10/1983 Japan .
61-265731 11/1986 Japan .
62-165732 7/1987 Japan .
62-170028 7/1987 Japan .
63-87617 4/1988 Japan .
63-144423 6/1988 Japan .
63-149839 6/1988 Japan .

Primary Examiner—William M. Shoop, Jr.
Assistant Examiner—David Martin

[57] ABSTRACT

A tilt adjustment mechanism for an object lens driving device (4) includes a base (13), a housing (3), a spherical supporting member (14) and adjustment screws (18a, 18b; 18c; 18d). The base (13) holds the object lens driving device (4). The housing (3) is provided with a supporting point (17) for supporting the base (13) and two adjustment points (20a, 20b; 20c; 20d). A straight line interconnecting the supporting point and one of the adjustment points is substantially at right angles with a straight line interconnecting the supporting point and the other of the adjustment points. The surface of the housing (3) facing to the base (13) is formed with a concave portion (17). The supporting member (14) is interposed between the base (13) and the housing (3) so as to be in point contact with the base and the housing. The screw hole (19a; 19c; 19d) is provided in one of the base and the housing. The holding portion (3c; 13d; 23a, 23b, 25a, 25b, 26a, 26b; 25c, 25d) for holding each of the adjustment screws meshing with this screw hole is provided to the other of the base and the housing.

6 Claims, 7 Drawing Sheets

FIG.3A PRIOR ART  FIG.3B PRIOR ART
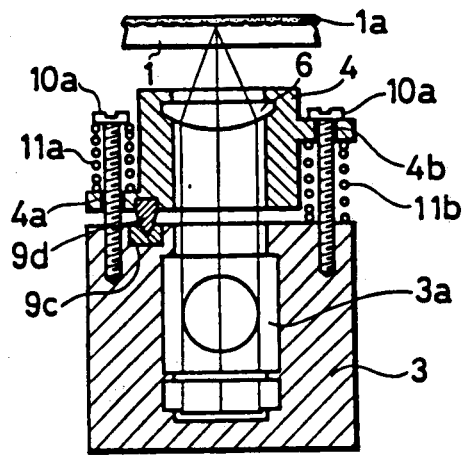
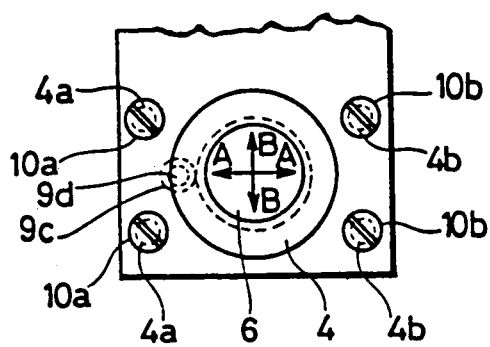
FIG.4B PRIOR ART
FIG.4A PRIOR ART
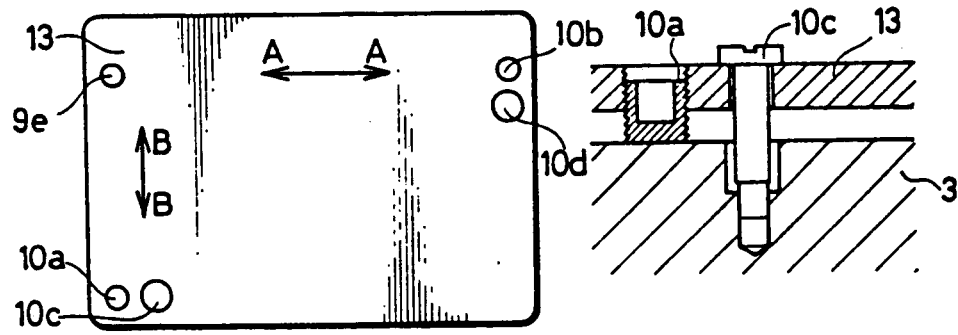
FIG.5B PRIOR ART
FIG.5A PRIOR ART
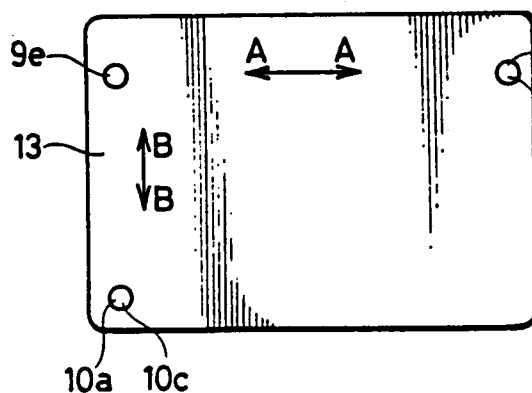
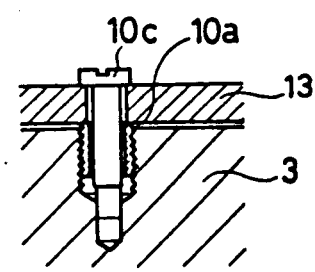

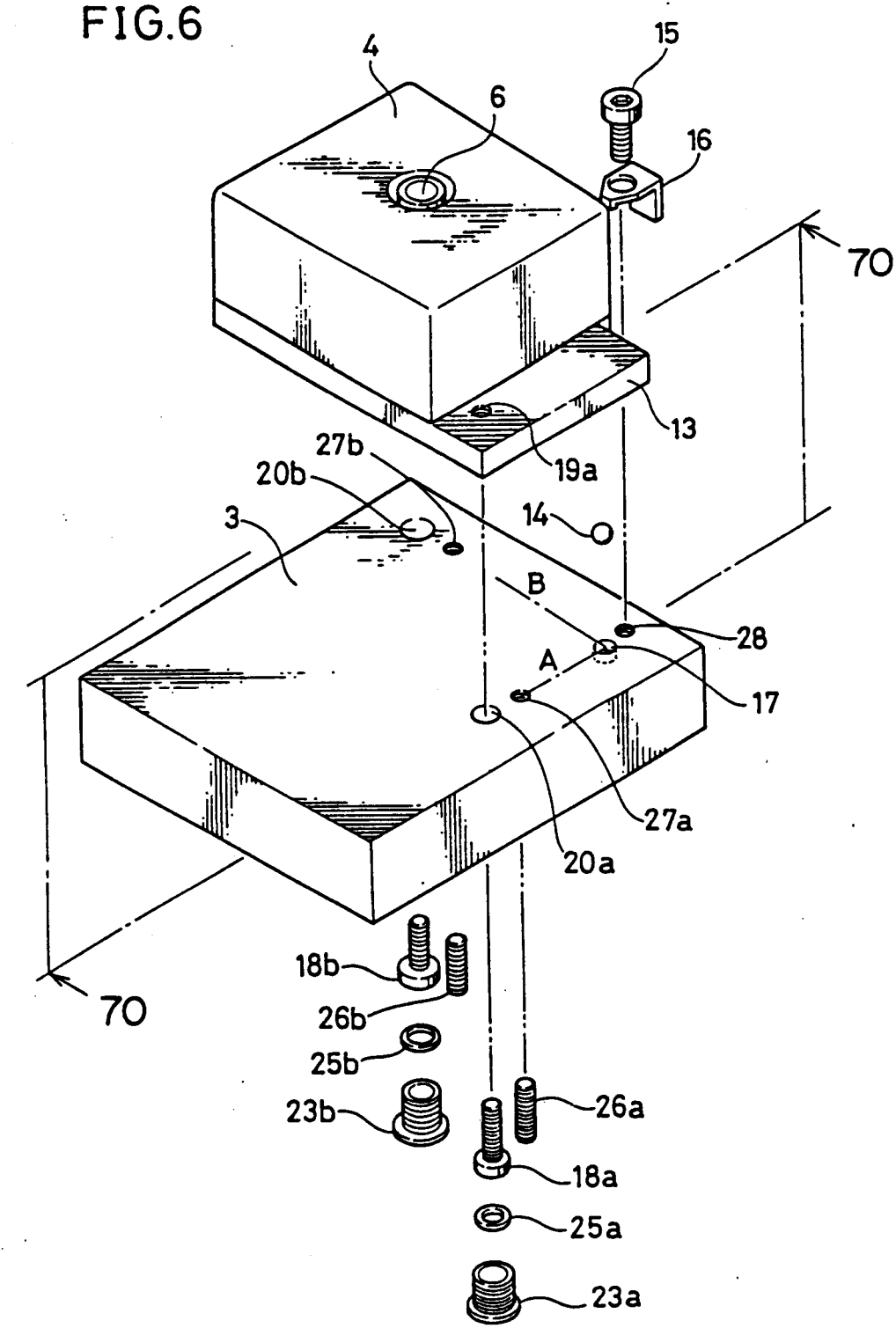

TILT ADJUSTMENT MECHANISM FOR OBJECT LENS DRIVING DEVICE

BACKGROUND OF THE INVENTION

1. Field of the Invention

This invention relates to a tilt adjustment mechanism for adjusting the tilt of an object lens driving device used for driving a object lens in the focusing or tracking direction, in an optical pick up device employed for recording, reproducing and/of erasure of information on a magneto-optical disk.

2. Description of Background Art

Referring to FIG. 1, an example of a magneto-optical disk as the background of the present invention will be explained. FIG. 1 is a diagrammatic side elevation showing an example of a conventional magneto-optical disk device forming the background of the present invention.

Referring to FIG. 1, the magneto-optical disk 1 rotated by an electric motor 2. A laser light 7 emitted from a laser light source 3a is reflected by a mirror 3b. The laser light 7 passes through an object lens 6 and converges on the surface of a disk-shaped recording medium enclosed in the magneto-optical disk 1. The recording, reproducing and/or erasing of information is performed optically by the medium of light spots formed in this manner on the disk-shaped recording medium 1a. An object lens driving device 4 drives the object lens 6 perpendicularly and horizontally for performing follow-up control of the converging position of the laser light 7, i.e., the position of formation of light spots, on the recording track of the disk shaped recording medium 1a. A housing 3 is provided with an optical system comprised of the laser light source 3a, the mirror 3b or the like. The optical pick up device, or, the optical head, is made up of the housing 3 and the object lens driving device 4. A electromagnet coil 5 forms a magnetic field for recording or erasing the information on and from the disk shaped recording medium 1a.

In the above described magneto-optical disk device, the central axis of the object lens 6 has a tilt with respect to an optical axis 7a of the laser light emitted from the laser light source 3a and reflected by the mirror 3b. In this case, the laser light 7 proceeding from the object lens 6 to the magneto-optical disk 1 undergoes an aberration which means the deviation of the wave front of the light with respect to a predetermined wave front. If the aberration occurs, the beam throttled by the object lens 6 cannot be throttled to a small size, or a true-circular light spot can not be formed on the disk shaped recording medium 1a. Thus the laser light 7 will not converge sufficiently causing cross-talk among the information data recorded on adjacent recording tracks on the disk shaped recording medium 1a. Cross-talk is defined as light of the light spot formed on the disk shaped recording medium 1a reaching the adjacent track by the aberration when the light spot is not truly circular so that the device reads signal on the adjacent track.

Conventionally, for overcoming the above inconvenience, a spacer 8 is interposed between the object lens driving device 4 and the housing 3, as shown in FIG. 1. The tilt of the object lens driving device 4 with respect to the housing 3 is adjusted by adjusting the thickness of the interposed spacer 8. In this manner, the central axis of the object lens 6 is adjusted so as to be substantially parallel to the optical axis 7a.

FIG. 2A is a plan view showing the tilt adjustment mechanism of the conventional object lens driving device, and FIG. 2B is a diagrammatic side elevation showing the tilt adjustment mechanism. In this tilt adjustment mechanism, a spherical concave portion 9a is formed on the upper surface of the housing 3. A mating spherical projection 9b is formed on the bottom surface of the object lens driving device 4. A coil spring 11 is interposed between the object lens driving device 4 and screws 10a, 10b. The object lens driving device 4 is supported by adjustment screws 10c, 10d on the housing 3. The tilt of the object lens driving device 4 with respect to the housing 3 may be adjusted by turning the screws 10c, 10d. After such adjustment, the object lens driving device 4 is secured by tightening the screws 10a, 10b or injecting an adhesive into the spherical concave portion 9a.

However, tilt adjustment using the spacer 8 necessitates a difficult adjustment operation and much adjustment time resulting in increased production costs. Also, by using the spherical concave portion 9a and the mating spherical projection 9b for adjustment, it is necessary to provide a region for formation of the spherical concave portion 9a in the housing 3. This results in the increased overall height of the device thus obstructing the reduction in the size of the overall device.

Alternatively, Japanese Patent No. 144423/1988 discloses another tilt adjustment mechanism. FIG. 3A is a cross sectional front view showing this tilt adjustment mechanism, and FIG. 3B is a partial top plan view of the tilt adjustment mechanism shown in FIG. 3A. Referring to these figures, a convex shaped supporting shaft 9d is provided on the lower surface of the object lens driving device 4. A mating concave shaped bearing 9c is provided on the upper surface of the housing 3. The object lens driving device 4 is provided with two screw hole sections 4a disposed on the lower side of the device 4, and two screw hole sections 4b provided on the upper side sections of the device 4. The driving device 4 is secured to the housing by an adjustment screw inserted into the screw hole section 4a by the medium of a compression spring 11a and another adjustment screw 10b inserted into the screw hole section 4b by the medium of another compression spring 11b. These adjustment screws 10a and 10b may be tightened or loosened with the contact point between the supporting shaft 9d and the bearing 9c as the fulcrum or supporting point for adjusting the tilt of the object lens driving device with respect to the housing 3 in the directions shown by the arrow marks A and B.

However, this tilt adjustment mechanism necessitates two additional components, namely, the supporting shaft and the bearing, resulting in increased assembling time and increased production costs. It is also difficult to perform precision machining after a predetermined length of the foremost part of the supporting shaft is assured with a predetermined arched or V shape. It is also difficult to perform a precise machining of the concave portion of the bearing to a predetermined arched or V shape. Thus, it becomes difficult to control the height position of the contact portions between the supporting shaft and the bearing among the various different devices within a small range of dispersion and, consequently, to control the reference height of the object lens within small dispersion range in adjusting the tilt of the object lens driving device with respect to the housing. In addition, the tilt adjustment mechanism is constituted by four adjustment points and one supporting point, resulting in increased assembling and adjustment time and increase production costs.

Japanese Patent No. 149839/1988 discloses still another tilt adjustment mechanism. FIG. 4A is a plan view showing the arrangement of the adjustment point and the support point in this tilt adjustment mechanism, and FIG. 4B is a partial sectional view at one adjustment point. FIG. 5A is a plan view showing the arrangement of an adjustment point and a support point for another example of the tilt adjustment mechanism disclosed in this Laying-Open publication, and FIG. 5B is a partial sectional view at one adjustment point shown in FIG. 5A.

Referring to FIGS. 4A and 4B, a base 13 supporting the object lens driving device has its tilt adjusted with respect to the housing 3 about one supporting point 9e as the center. The base 13 is provided with two adjustment points each formed by adjustment screws 10a, 10b and set screws 10c, 10d. The adjustment screws 10a and 10b may be turned clockwise or counterclockwise to adjust the tilt in the mutually perpendicular directions shown by the arrow marks A and B. For example, referring to FIG. 4B, the tilt is adjusted by turning the adjustment screw 10a, after which the set screw 10c is inserted and tightened to secure the base to the housing 3 with a predetermined distance in between.

Referring to FIGS. 5A and 5B, hollow adjustment screws 10a and 10b may be turned clockwise or counterclockwise to adjust the tilt of the base 13 with respect to the housing 3 in each of the directions shown by the arrow marks A and B. The set screws 10c and 10d are then inserted and tightened to secure the base 13 to the housing 3. At the support point 9e, the base 13 and the housing 3 are provided with a spherical projection and a mating spherical concave portion, respectively.

In the tilt adjustment mechanism shown in FIGS. 4A, 4B, 5A and 5B, it may occur that, when the set screw 10d at one adjustment point is tightened strongly, it is not possible to adjust the tilt by turning adjustment screw 10a at the other adjustment point. Referring to FIG. 4A and 4B, when the set screw 10d at one adjustment point is tightened strongly and the adjustment screw 10a at the other adjustment point is turned counterclockwise from above, that is, the adjustment screw 10a is turned in a direction of reducing the distance between the base 13 and the housing 3, there is formed a gap between the lower surface of the adjustment screw 10a and the upper surface of the housing 3. In this manner, there may be occasions where the tilt in one direction cannot be adjusted by simply turning the adjustment screw 10a at the one adjustment point. Thus, it is not possible to adjust the tilt in the direction for reducing distance between the base 13 and the housing 3 by turning the adjustment screw 10a counterclockwise unless the two set screws 10c and 10d at the one and the other adjustment points are loosened. Also, as shown in FIG. 5A and 5B, when the set screw 10d is tightened strongly and the hollow adjustment screw 10a is turned clockwise from above, there a gap forms between the upper surface of the adjustment screw 10a and the lower surface of the base 13. Hence, a similar problem arises to that described hereinbefore.

In addition, in the tilt adjustment mechanism shown in FIGS. 5A and 5B, hollow screws are employed as the adjustment screws resulting in increased production costs. Moreover, the above two tilt adjustment mechanisms make use of mutually registering spherical projections or recesses formed in each of the base 13 and the housing 3 as the supporting point. However, it is difficult to machine the mutually registering spherical projections and concave portions within a range of small dispersion having substantially equal radii of curvature. As a result, in adjusting the tilt of the object lens driving device, it is difficult to control the reference height of the object lenses among the different various devices within the range of small dispersion.

SUMMARY OF THE INVENTION

It is an object of the present invention to provide a tilt adjustment mechanism for an object lens driving device for controlling minutely the reference height of the object lens.

It is another object of the present invention to provide a tilt adjustment mechanism, having a support point and two adjustment points are provided and the tilt may be adjusted independently at each adjustment point.

It is still another object of the present invention to provide a tilt adjustment mechanism, wherein the assembling and adjustment time is not increased and the production costs are lowered.

The present invention provides a tilt adjustment mechanism for an object lens driving device. The tilt of an object lens driving device with respect to a housing provided within an optical system is adjusted so that the central axis of an object lens provided to the object lens driving device and adapted for forming a light spot on a recording medium is substantially parallel to an optical axis of a light beam of the optical system irradiated on the object lens. This tilt adjustment mechanism includes a base, a housing, a spherical support member and adjustment screws. The base holds the object lens driving device. The housing is provided with a supporting point for supporting the base and two adjustment points. A straight line connecting one of the two adjustment points and the supporting point and a straight line connecting the other adjustment point and the supporting point are adapted to be substantially orthogonal to each other. A concave portion is formed at the supporting point on the surface of the housing facing to the base. A spherical supporting member is fitted into the concave portion and interposed between the base and the housing so as to be in point contact with the base and the housing. The adjustment screws are provided at each of the two adjustment points for modifying the distance between the base and the housing. At these two adjustment points, one of the base and the housing is provided with screw holes and the other is provided with means for holding the adjustment screws meshing with these screw holes.

According to a preferred embodiment of the present invention, the holding means includes biasing means interposed between the base and the housing and a retaining portion retaining the adjustment screws in contact therewith. At the supporting point, a presser member may be additionally provided and attached to the base so that the base thrusts the spherical supporting member.

According to the present invention, the spherical supporting member is interposed between the base and the housing in point contact therewith and at a portion constituting the supporting point for tilt adjustment. Consequently, the spherical supporting member and the concave portion can be machined easily with high precision so that the diameter of the spherical supporting member and the depth of the concave portion into which the supporting member is fitted may be controlled within a lesser range of dispersion. It is therefore possible to reduce the dispersion in the distance between the housing and the object lens driving device, that is, the dispersion in the distance between the housing and the object lens, among various different devices, for adjusting the tilt of the object lens driving device with respect to the housing. In this manner, the reference height of the object lens can be controlled minutely.

Also, at the two adjustment points, the adjustment screws are turned while being held by the base or the housing. It is possible in this manner to adjust the tilt separately at each adjustment point, no matter whether the adjustment screws are turned in the clockwise direction or in the counterclockwise direction. That is to say, the tilt in each of the two mutually perpendicular directions may be adjusted separately by each one adjustment screw.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 3A is a cross sectional front view showing another conventional tilt adjustment mechanism.

FIG. 3B is a partial top plan view of the tilt adjustment mechanism shown in FIG. 3A.

FIG. 4A is a plan view showing the disposition between the supporting point and the adjustment points in another conventional tilt adjustment mechanism.

FIG. 4B is a partial sectional view at one of the adjustment points shown in FIG. 4A.

FIG. 5A is a plan view showing the disposition between the supporting point and the adjustment points in still another conventional tilt adjustment mechanism.

FIG. 5B is a partial sectional view at one of the adjustment points shown in FIG. 5A.

FIG. 6 is an exploded perspective view showing an embodiment of a tilt adjustment mechanism of an object lens driving device according to the present invention.

DESCRIPTION OF THE PREFERRED EMBODIMENTS

Figure 1:
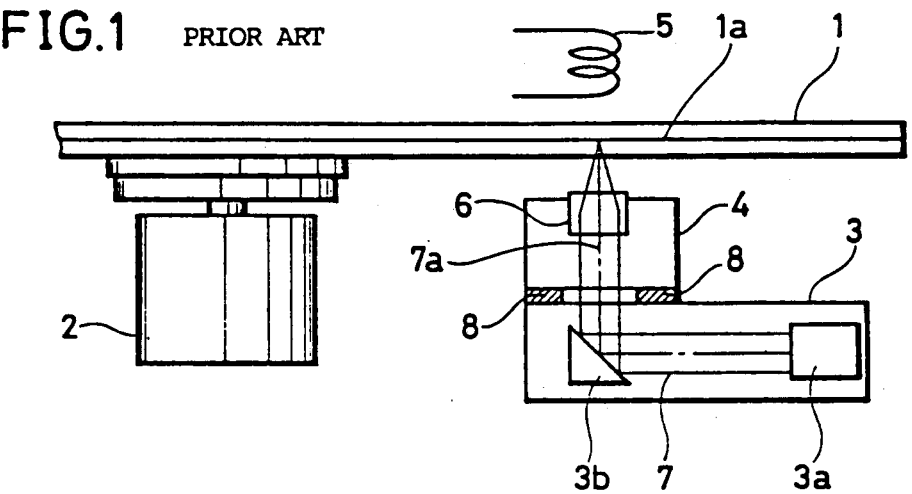
FIG. 1. is a diagrammatic side elevation showing an example of a magneto-optical disk forming the background of the present invention.
Figure 2A:
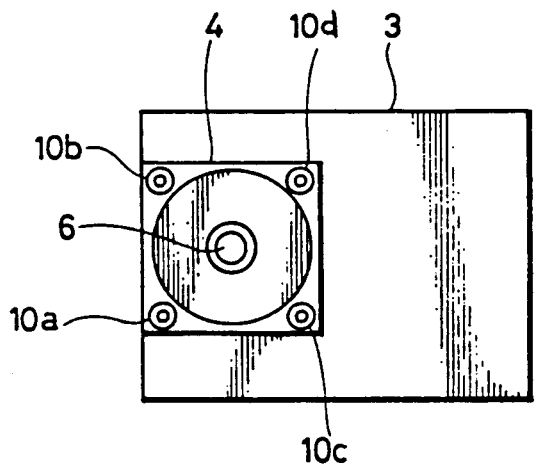
FIG. 2A is a plan view showing a tilt adjustment mechanism of a conventional object lens driving device.
Figure 2B:
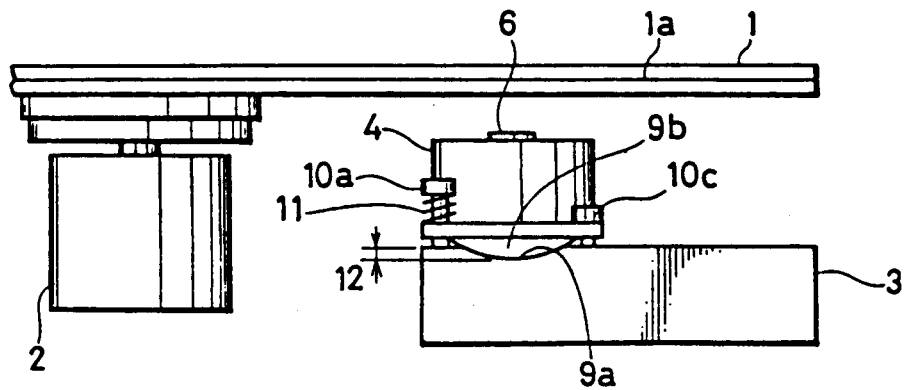
FIG. 2B. is a diagrammatic side elevation showing the tilt adjustment mechanism shown in FIG. 2A.

Referring to the drawings, certain preferred embodiments of the present invention will be explained in detail.

Figure 7:
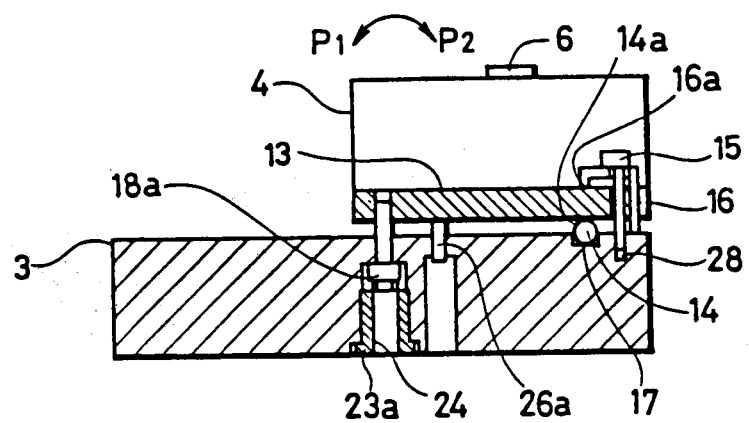
FIG. 7 is a sectional view taken along the line 70 in FIG. 6.
Figure 13:
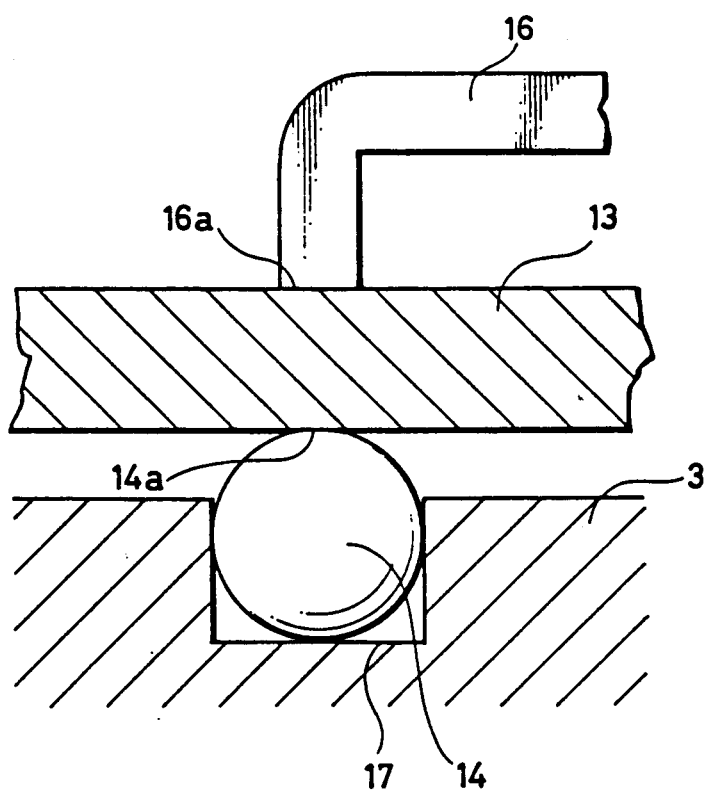
FIG. 13 is a partial enlarged sectional view showing a supporting point of the tilt adjustment mechanism of the object lens driving device according to the present invention.

Referring to FIG. 6, an object lens driving device 4 is provided on a housing having a single supporting point defined a steel ball 14. Steel ball 14 is fitted into a concave portion 17 formed at the corner of one face of the housing 3, and held so that its upper portion protrudes slightly from the upper surface of the housing 3. A portion of the bottom surface of a base 13 abuts the steel ball 14. Referring to FIGS. 7 and 13, a presser metal fitting 16 occupies a point 16a on the upper surface of the base 13. Point 16a opposes a contact point 14a between the base 13 and the steel ball 14. This permits the lens driving device 4 to tilt and shift the contact point 14a with the steel ball 14 as the supporting point. A set screw 15 meshes with a screw hole 28 formed in the housing 3 using presser metal fitting 16. Thus, the presser metal fitting 16 is held by the set screw 15. A concave portion 17 has a depth sufficient to hold the steel ball 14 therein with the upper portion of the steel ball projecting slightly above the upper surface of the housing 3. The precise depth may be assured easily by end milling. The precision in the diameter of the steel ball 14 may also be assured easily by machining. Thus, by controlling minutely the tolerance in the diameter of the steel ball 14 and the tolerance in the depth of the concave portion 17 receiving the steel ball 14, the distance between the base 13 and the housing 3, that is, the distance between the housing 3 and the object lens driving device 4, can be procured within the lesser range of dispersion. As a result, the reference height of the object lens 6 can be controlled easily by adjusting the tilt of the object lens driving device 4 with respect to the housing 3. Also the moment about the supporting point can be reduced by the presser metal fitting 16 pressing the base 13 downwards at a position substantially above the steel ball 14 acting as a supporting point. As a result, the manual force required for tilt adjustment can be reduced and tilt adjustment can be facilitated.

Referring again to FIG. 6, the housing 3 is formed with mounting holes 20a and 20b for attachment of adjustment screws 18a and 18b. These adjustment screws 18a and 18b are adapted to be kept in position with the screw portions thereof protruding from the upper surface of the housing 3 by virtue of spring washers 25a and 25b and set screws 23a and 23b. The tilt of the base 13 may be adjusted by turning these adjustment screws 18a and 18b clockwise or counterclockwise. The mounting holes 20a and 20b are arranged so that a straight line A interconnecting the mounting hole 20a and the concave portion 17 is at right angles with a straight line B interconnecting the mounting hole 20b and the concave portion 17. In this manner, the supporting point and the adjustment points are arranged so that the straight line interconnecting the supporting point and one adjustment point and the straight line interconnecting the supporting point and the other adjustment point are at right angles with each other.

Figure 8:
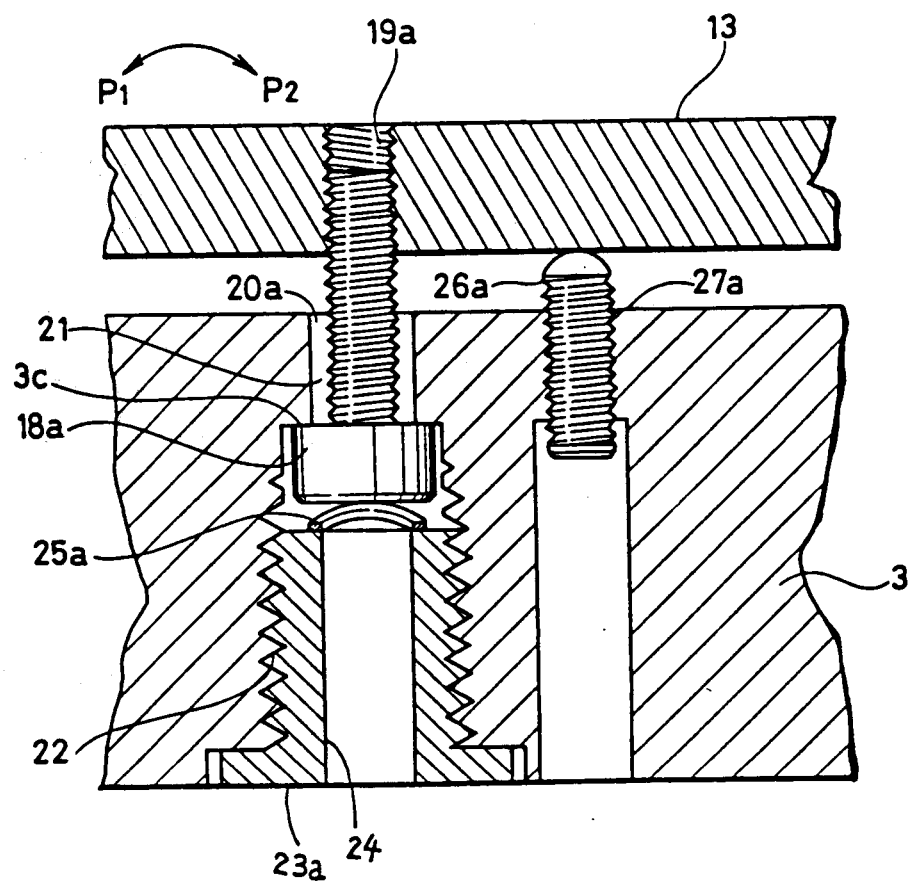
FIG. 8 is a partial enlarged cross sectional view at one adjustment point of FIG. 7.

The mounting hole 20a is counterbored, as shown in FIG. 8. The upper portion of the mounting hole 20a has an opening section 21 larger in diameter than the screw portion of the adjustment screw 18a and lesser in diameter than the head of the adjustment screw 18a. The lower portion of the mounting hole 20a has a screw hole section 22 lying on the line of extension of the opening section 21 and having a screw thread ridge diameter larger than the head diameter of the adjustment screw 18a. The adjustment screw 18a is inserted from below into the thus formed mounting hole 20a. The screw portion of the adjustment screw 18a is passed through the opening section 21 so as to be protruded from the upper surface of the housing 3. The set screw 23a is engaged in the screw hole section 22. In this manner, the adjustment screw 18a is held as it is thrusted from below. The set screw 23a is formed with a central through hole 24 for introducing an adjustment tool, such as a hexagonal wrench. The adjustment screw 18a may be turned by the adjustment tool inserted into this through hole 24. Between the set screw 23a and the head of the adjustment screw 18a, a spring washer 25a is interposed in the resiliently deformed and compressed state. Thus the head of the adjustment screw 18a is perpetually thrusted onto the retaining portion 3c of the housing 3. The adjustment screw 18b is held by the spring washer 25b and the set screw 23b in this mounting hole 20b in the manner described above. Referring back to FIG. 6, the mounting hole 20b is formed similarly.

The base 13 is formed with screw holes 19a registering with the mounting holes 20a and 20b. The screw hole in resister with the mounting hole 20b is omitted for simplicity. The adjustment screws 18a and 18b engage the screw holes 19a in the housing 3.

Screw holes 27a and 27b are formed on the straight lines A and B on the upper surface of the housing 3 as shown in FIG. 6. Locking screws 26a and 26b engage screw holes 27a and 27b to support the bottom of the base 13 at the foremost parts thereof protruding from the upper surface of the housing 3. This prevents deviation caused by any backlash at the time of meshing of the adjustment screws 18a and 18b with the threaded holes 19a.

The tilt adjustment process with the aid of the above described tilt adjustment mechanism is hereinafter explained. When the adjustment screw 18a is turned clockwise when seen from below, the base is turned in the direction of the arrow mark P1 in FIGS. 7 and 8, with the contact point 14a as the supporting point. On the other hand, when the adjustment screw 18a is turned counterclockwise when seen from below, the base 13 is turned in the direction of the arrow mark P2 with the contact point 14a as the supporting point, under the action of the spring washer 25a. This permits the tilt of the object lens drive device 4 to be adjusted. After this tilt adjustment, the locking screw 26a is engaged in the screw hole 27a of the housing 3 so that the pointed end part of the locking screw 26a abuts on the bottom surface of the base 13. In this manner, any deviation otherwise caused by a backlash between the adjustment screw 18a and the thread ridge 19a can be prevented from occurring providing for a stable support of the tilt-adjusted base 13. In this manner, the object lens driving device 4 may be adjusted for tilt in the direction shown by the straight line A in FIG. 6, or in the direction shown by the arrow mark P1 and P2 in FIGS. 7 and 8, with the aid of the adjustment screw 18a. On the other hand, the object lens driving device 4 can be similarly adjusted for tilt in the direction shown by the straight line B in FIG. 6, or in the direction normal to the direction shown by the arrow marks P1 and P2, with the aid of the adjustment screw 18b. The object lens driving device 4 can be adjusted for tilt omnidirectionally by the turning of the adjustment screws 18a and 18b.

As shown in the above embodiment, the adjustment screws are held by the housing 3, so that the tilt of the base 13 may be changed no matter whether the adjustment screws are turned in the clockwise direction or in the counterclockwise direction. Also, when one adjustment screw is turned, the other locking screw need not be loosened. Therefore, the tilt adjustment by one of the adjustment screws can be performed without regard to the other tilt adjustment operation. In addition, the distance between the locking screw and the adjustment screw is markedly lesser than the distance between the supporting point and the locking screw, so that the stress applied to the base is applied to only a restricted portion of the base, while being low in magnitude. Moreover, since the locking screw is positioned on the straight line interconnecting the supporting point and the adjustment screw, there is no moment of force acting in a direction orthogonal to this straight line, so that there is no angular change in the direction. Accordingly, any stress large enough to affect the tilt of the base after adjustment is not produced in the base.

Figure 9:
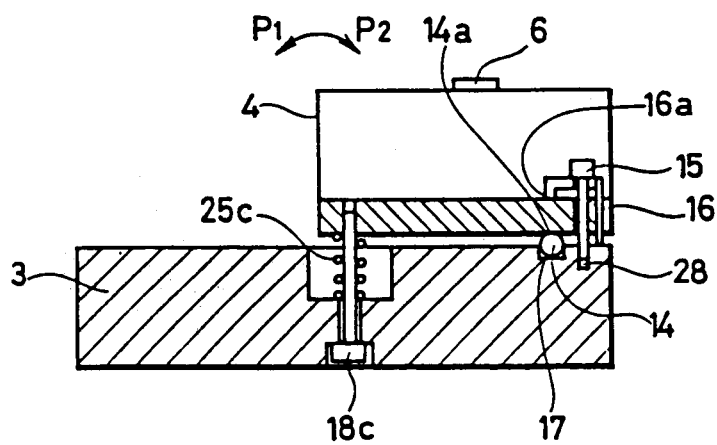
FIG. 9 is a sectional view showing another embodiment of the tilt adjustment mechanism of the object lens driving device according to the present invention.
Figure 10:
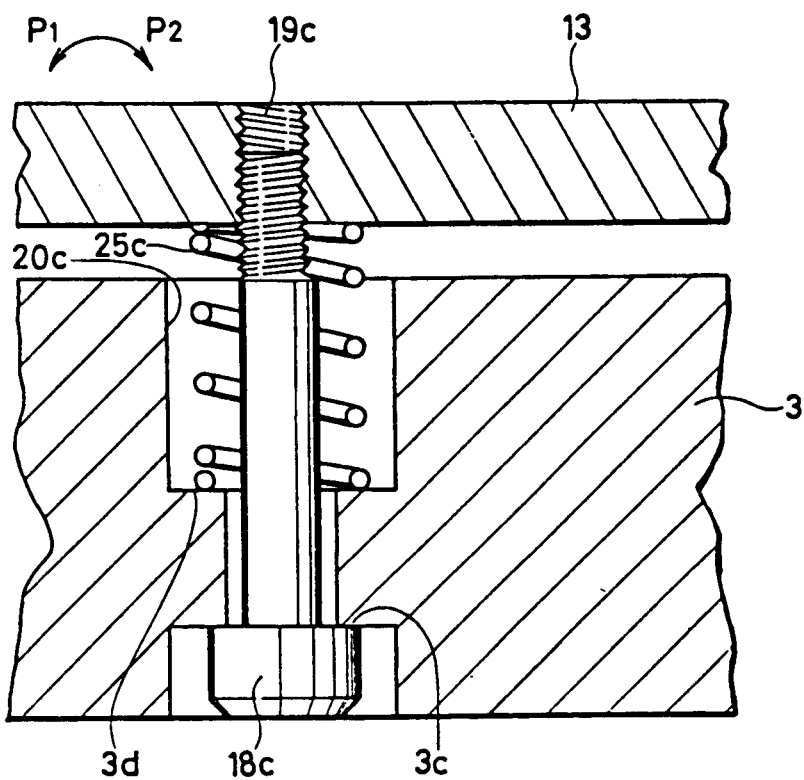
FIG. 10 is a partial enlarged sectional view at one adjustment point of FIG. 9.

In the above embodiment, the spring washer and the set screw are used for holding the adjustment screws on the housing, while the locking screws are used for preventing deviation caused by backlash at the adjustment screws. The mechanism for holding the adjustment screws in a more facilitated manner is shown in FIGS. 9, 10, 11 and 12. Referring to FIGS. 9 and 10, the housing 3 is formed with a mounting hole 20c for attachment of the adjustment screw 18c. A coil spring 25c is interposed between a step 3d of the mounting hole 20c and the lower surface of the base 13. The adjustment screw 18c is inserted from below into the mounting hole 20c. The screw portion of the adjustment screw 18c protrudes from the upper surface of the housing 3 with the intermediary of the coil spring 25c. The screw portion of the adjustment screw 18c engages the screw hole 19c of the base 13. In this manner, the adjustment screw 18c is held within the housing 3 with the head of the adjustment screw 18c perpetually thrusts into the retaining portion 3c of the housing 3. In this manner, the tilt of the base 13 can be adjusted by the coil spring 25c and the retaining portion 3c, regardless of whether the adjustment screw 18c is turned in a clockwise direction or a counterclockwise direction. Any deviation caused by backlash between the adjustment screw 18c and the screw hole 19c can be effectively prevented by the coil spring 25c.

Figure 11:
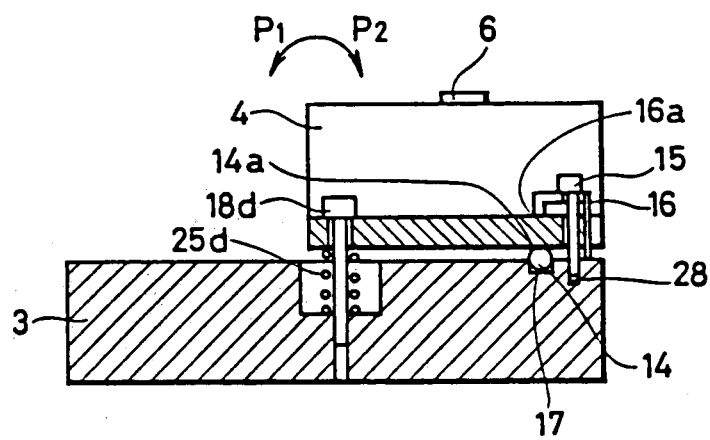
FIG. 11 is a sectional view showing still another embodiment of the tilt adjustment mechanism of the object lens driving device according to the present invention.
Figure 12:
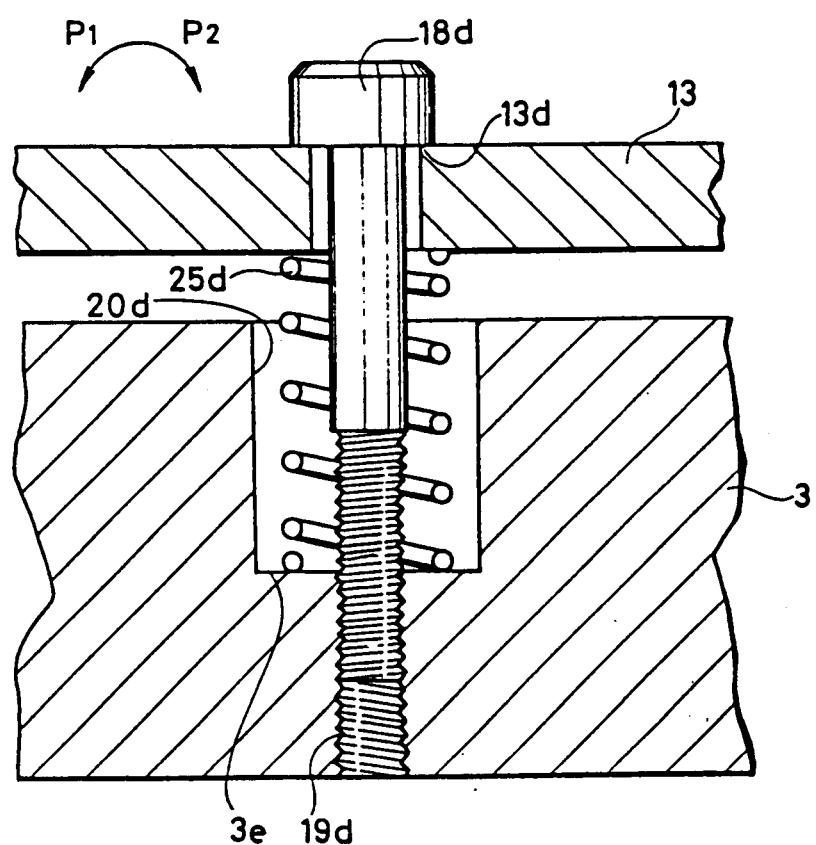
FIG. 12 is a partial enlarged sectional view at one adjustment point of FIG. 11.

Referring to FIGS. 11 and 12, an adjustment screw 18d is provided for being turned from above. In this case, a coil spring 25d is interposed between the lower surface of the base 13 and a step 3e of the mounting hole 20d. In this manner, the head of the adjustment screw 18d is thrust perpetually onto the retaining portion 13d of the base. Similar to the embodiment shown in FIG. 10, the coil spring 25d prevents effectively the deviation between the adjustment screw 18d and the screw portion 19d.

Meantime, the embodiment shown in FIGS. 9 and 10 and the embodiment shown in FIGS. 11 and 12 are similar to the embodiment shown in FIGS. 7 and 8 in construction with the exception of the adjustment screws and related portions.

In the embodiments shown in FIGS. 7 to 10, tilt adjustment may be made from below. The tilt adjustment operation may be performed with visual checking of beam spots having the diameter of about 1μm. The optical system used for observing these beam spots is provided on the side of the object lens. Therefore, when the tilt adjustment is performed from below, the adjustment operation can be facilitated since the optical system does not prove to be a hindrance.

Although a steel ball is used as the supporting member in the above embodiments, the supporting members may be made of any desired material other than steel.

According to the present invention, as described hereinabove, since the spherical supporting member is interposed at the supporting point, the reference height of the object lens may be controlled within the lesser range of dispersion. The time involved in adjustment may be reduced, while the production costs may also be lowered. In addition, the adjustment operation may be performed independently at each of the two adjustment points.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A tilt adjustment mechanism for an object lens driving device, wherein the tilt of an object lens driving device with respect to a housing provided with an optical system is adjusted so that the central axis of an object lens provided to said object lens driving device and adapted for forming a light spot on a recording medium is substantially parallel to an optical axis of a light beam of said optical system irradiated on said object lens, in which the information is optically written to or read from said recording medium, said tilt adjustment mechanism comprising:

a base for holding the object lens driving device;

said housing having a supporting point for supporting the base and two adjustment points, said supporting point and said adjustment points arranged so that a straight line interconnecting said one supporting point and one of said adjustment points lie substantially perpendicular with a straight line interconnecting said one supporting point and the other of said adjustment points, said housing also including a concave portion formed at said supporting point on the surface of the housing facing said base;

a spherical supporting member fitted into said concave portion and interposed between said base and said housing to form a contact point therewith; and adjustment screws provided at each of said two adjustment points for modifying the distance between said base and said housing;

wherein, at each of the two respective adjustment points, one of said base and said housing having an aperture and the other having a holding means for holding each of said adjustment screws for positioning said base with respect to said housing.

2. The tilt adjustment mechanism according to claim 1, wherein said holding means further comprising biasing means interposed between and for spacing said base and said housing and a retaining portion retaining said adjustment screw in contact with said base and housing.

3. The tilt adjustment mechanism according to claim 1, wherein said base has a screw hole at each of said two adjustment points, said housing further comprising holding means for holding said adjustment screws holes meshed with said screw holes, and biasing means interposed between said fixed members and said adjustment screws for spacing said base from said housing, and a retaining member for retaining said base in contact with and secured to said housing.

4. The tilt adjustment mechanism according to claim 2, wherein said biasing means includes spring members.

5. The tilt adjustment mechanism according to claim 1, further comprising presser member means for thrusting said base onto said spherical supporting member at said supporting point.

* * * * *